US009452932B2

(12) United States Patent
Park et al.

(10) Patent No.: US 9,452,932 B2
(45) Date of Patent: Sep. 27, 2016

(54) HYDROGEN PRODUCTION MODULE BY INTEGRATED REACTION/SEPARATION PROCESS, AND HYDROGEN PRODUCTION REACTOR USING SAME

(75) Inventors: Jong-Soo Park, Daejeon (KR); Kyung-Ran Hwang, Daejeon (KR); Shin-Kun Ryi, Daejeon (KR); Chun-Boo Lee, Daejeon (KR); Sung-Wook Lee, Naju-si (KR); Jin-Woo Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 185 days.

(21) Appl. No.: 14/354,854

(22) PCT Filed: Aug. 8, 2012

(86) PCT No.: PCT/KR2012/006300
§ 371 (c)(1),
(2), (4) Date: Jul. 17, 2014

(87) PCT Pub. No.: WO2013/062217
PCT Pub. Date: May 2, 2013

(65) Prior Publication Data
US 2015/0298971 A1    Oct. 22, 2015

(30) Foreign Application Priority Data
Oct. 28, 2011    (KR) .................. 10-2011-0111015

(51) Int. Cl.
| | |
|---|---|
| *B01J 7/00* | (2006.01) |
| *C01B 3/38* | (2006.01) |
| *B01J 19/00* | (2006.01) |
| *B01J 19/24* | (2006.01) |

(52) U.S. Cl.
CPC .............. *C01B 3/38* (2013.01); *B01J 19/0093* (2013.01); *B01J 19/249* (2013.01);
(Continued)

(58) Field of Classification Search
CPC ............ B01J 19/249; B01J 2219/2453; B01J 2219/2458; B01J 2219/2461; B01J 2219/2475; B01J 2219/2479
See application file for complete search history.

(56) References Cited

U.S. PATENT DOCUMENTS

| | | | |
|---|---|---|---|
| 7,101,421 B2 | 9/2006 | Edlund et al. | |
| 2001/0045061 A1* | 11/2001 | Edlund .................. | B01B 1/005 48/76 |

(Continued)

FOREIGN PATENT DOCUMENTS

| | | |
|---|---|---|
| JP | 2011-195393 A | 10/2011 |
| KR | 10-2011-0037639 A | 4/2011 |
| KR | 10-2011-0092416 A | 8/2011 |

OTHER PUBLICATIONS

English Translation of International Search Report in International Application No. PCT/KR2012/006300; mailed Feb. 18, 2013.

*Primary Examiner* — Imran Akram
(74) *Attorney, Agent, or Firm* — Baker Hostetler LLP

(57) ABSTRACT

The present invention relates to a hydrogen production module by an integrated reaction/separation process, and a hydrogen production reactor using the same, and more specifically, provides a hydrogen production apparatus which laminates a plurality of layered unit cells, is mounted in a pressure-resistant chamber, and can be operated at a high pressure, wherein the unit cell comprises a first modified catalyst, and a second modified catalyst opposite to a hydrogen separator. The hydrogen production module can produce hydrogen using a hydrocarbon, carbon monoxide and an alcohol as sources. Particularly, all the modified catalysts are formed into a porous metal plate form, thereby maximizing the heat transfer effect necessary for reaction. While a reaction and separation of hydrogen simultaneously occur, separated reactants permeate the first modified catalyst so as to come in contact with the same, and then pass through the gap between the hydrogen separator and the second modified catalyst opposite to each other. Therefore, it is possible to obtain a high efficiency over the equilibrium conversion rate of reaction temperature, and high purity hydrogen can be obtained.

7 Claims, 5 Drawing Sheets

(52) U.S. Cl.
CPC ............... *B01J 2219/00783* (2013.01); *B01J 2219/00835* (2013.01); *B01J 2219/00844* (2013.01); *B01J 2219/00873* (2013.01); *B01J 2219/00907* (2013.01); *B01J 2219/2453* (2013.01); *B01J 2219/2458* (2013.01); *B01J 2219/2461* (2013.01); *B01J 2219/2475* (2013.01); *B01J 2219/2479* (2013.01); *C01B 2203/0283* (2013.01); *C01B 2203/041* (2013.01); *C01B 2203/1058* (2013.01); *C01B 2203/1241* (2013.01); *C01B 2203/142* (2013.01)

(56) References Cited

U.S. PATENT DOCUMENTS

| | | | | |
|---|---|---|---|---|
| 2005/0039401 A1* | 2/2005 | Lamm | ............... | B01J 8/009 48/198.7 |
| 2005/0123472 A1* | 6/2005 | Hall | ............... | B01J 19/088 423/651 |
| 2005/0191534 A1* | 9/2005 | Kim | ............... | B01J 19/249 429/412 |
| 2006/0013759 A1* | 1/2006 | Jiang | ............... | B01J 19/249 423/648.1 |
| 2006/0233700 A1* | 10/2006 | Chellappa | ............... | B01J 19/0093 423/648.1 |
| 2007/0137104 A1* | 6/2007 | Kamijo | ............... | C01B 3/384 48/127.9 |
| 2010/0044642 A1* | 2/2010 | Dijkstra | ............... | B01J 8/009 252/373 |
| 2010/0068132 A1* | 3/2010 | Vencill | ............... | B01J 19/0093 423/648.1 |

\* cited by examiner

103

104

HYDROGEN PRODUCTION MODULE BY INTEGRATED REACTION/SEPARATION PROCESS, AND HYDROGEN PRODUCTION REACTOR USING SAME

CROSS-REFERENCE TO RELATED APPLICATIONS

This application is a National Stage of International Patent Application No. PCT/KR2012/006300, filed Aug. 8, 2012 and claims priority to foreign application KR 10-2011-0111015, filed Oct. 28, 2011, the contents of which are incorporated herein by reference in their entirety.

TECHNICAL FIELD

The present invention relates to a hydrogen production module and a hydrogen production reactor using the same, and more specifically, to a hydrogen production module capable of producing hydrogen with high efficiency exceeding the equilibrium conversion by an integrated reaction/separation process from hydrocarbon or carbon monoxide, and a hydrogen production reactor using the same.

BACKGROUND ART

Hydrogen, which is an energy source of the future and also a fundamental material in chemical and electronic industry processes, is being manufactured through a variety of paths.

Of various reactions, a steam reforming reaction (Reaction Formula 1, hereinafter referred to as an "SR") using a natural gas is widely used industrially because of its high concentration of resulting hydrogen.

$$CH_4 + H_2O \leftrightarrow CO + 3H_2, \text{ reaction heat} = 205.8 \text{ kJ/mol} \quad \text{Reaction Formula 1}$$

After reaction of Reaction Formula 1, a carbon monoxide transfer reaction (water gas shift, hereinafter referred to as a "WGS") is conducted to increase a hydrogen concentration according to Reaction Formula 2, and subsequently the process of separating hydrogen is carried out in the cooling/water removal, pressure swing adsorption (PSA) unit processes.

$$CO + H_2O \leftrightarrow CO_2 + H_2, \text{ reaction heat} = -41.2 \text{ kJ/mol} \quad \text{Reaction Formula 2}$$

The SR reaction relevant to Reaction Formula 1 is an equilibrium reaction with a large amount of heat absorption, wherein a high temperature is inevitable. The WGS reaction according to Reaction Formula 2 is an equilibrium reaction and the process temperature is increased by the generated heat. Because of that, it is inevitable that the reaction gas is required to be cooled after a high temperature shift (HTS) reaction followed by a low temperature shift (LTS) reaction. Therefore, the whole process is carried out in a huge plant, and there is a problem of low heat efficiency. Thus, it is necessary to develop a new process to substitute this.

In order to improve the above-described problems, research into a metal catalyst with a fast heat transfer rate and a micro-channel reactor using the same is under way.

In addition, based on the idea that a hydrogen generation reaction is an equilibrium reaction, Mitsubishi Heavy Industries of Japan has worked on the development of a simplified process in which a hydrogen separation membrane is used to break equilibrium by removing hydrogen simultaneously with the reaction, and thereby high-concentration hydrogen can be obtained simultaneously with a low-temperature reforming reaction. (Y. Shirasaki et al, Development of membrane reformer system for highly efficient hydrogen production from natural gas, Int. J. Hydrogen Energy, 34 (2009) 4482-4487, K.-R. Hwang et al., A catalytic membrane reactor for water-gas shift reaction, Korean J. Chem. Eng., 27 (3) (2010) 816-821).

As above-described method, Hwang et al. improved the transfer rate of carbon monoxide by removing hydrogen simultaneously with the carbon monoxide aqueous reaction.

The essential point in the two reactors described above is in disposing catalyst around the separation membrane as a configuration method of catalyst and reactor, and many researchers have put in a great deal of effort for this. In such a configuration, a metal web coated with catalyst is located at a near distance but not in contact with the separation membrane, or a fine powder catalyst is located in a basket to maintain a certain interval with the separation membrane. That is, the positions of the separation membrane and the catalyst are fixed, and only the catalyst is located at the entrance of the reactor because the amount of generated hydrogen is small especially at the entrance thereof, and from the latter half of a certain distance, the separation membrane is located around the catalyst. Such a configuration is at no more than a research stage for verifying a possibility of a simultaneous process of reaction separation, and consequently there are many problems as a technology for efficiency maximization or for scaling up to a large volume. Especially in order to maximize the reaction separation effect, a configuration that can raise the reaction operation pressure is necessary. For this, a new approach is necessary due to structural characteristics.

That is, there is a big difference in performance according the spatial configuration method between the separation membrane and the catalyst. By considering making it for a large volume and mass production, it can be seen that a configuration that is easy to scale up is necessary.

DISCLOSURE

Technical Problem

Accordingly, it is a first object of the present invention to provide an integrated reaction/separation process which produces hydrogen with high efficiency using hydrocarbon and/or carbon monoxide.

A second object of the present invention is to provide a hydrogen production reactor which may be increased in scale by a technique of forming the reactor in a unit cell and laminating the unit cells.

Technical Solution

The present invention for attaining the above-described objects utilizes a high-efficiency integrated reaction/separation process with the scale up made easy by the arrangement of a catalyst and separation membrane that can maximize the reaction efficiency and the repetition of unit cells.

According to one aspect of the present invention, there is provided a hydrogen production module including: an inlet passage configured to inflow a reaction gas; a first reforming passage which is communicated with the inlet passage, and is configured to contact the reaction gas supplied from the inlet passage with a first reforming catalyst so as to reform the reaction gas; a second reforming passage which is connected to the first reforming passage to pass the reformed gas between the second reforming passage and a hydrogen separation membrane; an impermeable gas discharge passage configured to discharge an impermeable gas from which hydrogen is removed while passing through the second reforming passage; and a hydrogen discharge passage which is communicated with a permeation side of the hydrogen separation membrane to discharge a hydrogen gas, wherein both end portions of the inlet passage, the impermeable gas discharge passage, and the hydrogen discharge passage are exposed to an outside, respectively.

The present invention may embody in such a manner that, the hydrogen production module includes: a reaction gas inlet plate on which a reaction gas channel is formed on an upper surface thereof; a first reforming catalyst plate which is placed on the reaction gas inlet plate, and includes a first reforming catalyst which is transmissive to reaction gas disposed therein; a reforming gas transfer plate which is placed on the first reforming catalyst plate, and includes a reforming gas channel formed on a lower surface thereof at a position corresponding to the first reforming catalyst; a second reforming catalyst plate which is placed on the reforming gas transfer plate, and includes a second reforming catalyst which is non-transmissive to reaction gas disposed therein; a gap holding plate which is placed on the second reforming catalyst plate, and includes a gap flow hole formed therein at a position corresponding to the second reforming catalyst; a hydrogen separation membrane plate which is placed on the gap holding plate, and includes a hydrogen separation membrane disposed therein at a position corresponding to the gap flow hole; and a hydrogen transfer plate which is placed on the hydrogen separation membrane plate, and includes a hydrogen transfer channel formed on a lower surface thereof at a position corresponding to the hydrogen separation membrane plate, wherein each of the reaction gas inlet plate, the first reforming catalyst plate, the reforming gas transfer plate, the second reforming catalyst plate, the gap holding plate, the hydrogen separation membrane plate, and the hydrogen transfer plate has a hydrogen gas outlet hole, a reaction gas inlet hole, and an impermeable gas outlet hole, which are respectively formed therein to be spaced apart from each other, and the reaction gas inlet hole is communicated with the reaction gas channel in the reaction gas inlet plate, the reforming gas transfer plate has a reforming gas supplying hole formed therein to be communicated with the reforming gas channel, each of the second reforming catalyst plate and the gap holding plate has a reforming gas supplying hole formed therein to be communicated with the reforming gas supplying hole of the reforming gas transfer plate, the gap flow hole is communicated with the reforming gas supplying hole and the impermeable gas outlet hole in the gap holding plate, and the hydrogen transfer channel is communicated with the hydrogen gas outlet hole in the hydrogen transfer plate.

Herein, it is preferable that the area of the reaction gas inlet hole is larger than the area of the impermeable gas outlet hole, thereby the transmission of the hydrogen through the hydrogen separation membrane may be improved.

According to another aspect of the present invention, there is provided a hydrogen production reactor including: one or more of the hydrogen production module according the above, wherein the inlet passage, the impermeable gas discharge passage, and the hydrogen discharge passage are connected to the reaction gas supply pipe, the impermeable gas discharge pipe, and the hydrogen discharge pipe, respectively.

Further, in consideration of an operation under high pressure conditions, the hydrogen production module may installed in a pressure chamber.

When using the reaction gas as a gas in the pressure chamber, the reaction gas supply pipe is disposed in the pressure chamber, the inlet passage is communicated with an inner space of the pressure chamber, and the impermeable gas discharge and the hydrogen discharge pipe are disposed in the pressure chamber so as to pass therethrough.

Further, when using an inert gas as the gas in the pressure chamber, the pressure chamber is supplied with a pressurized gas, and the reaction gas supply pipe, the impermeable gas discharge pipe, and the hydrogen discharge pipe are disposed in the pressure chamber so as to pass therethrough.

Advantageous Effects

By the development of a reactor for a unit cell lamination type integrated reaction/separation process, it is possible to provide a compact hydrogen production reactor with improved heat efficiency and can respond to various hydrogen producing scales. Therefore, improvement of competitiveness is expected in the hydrogen producing and hydrogen utilization processes.

It will be apparent to those skilled in the art that various alterations and modifications of the present invention are duly included within the scope and spirit of the present invention and the concrete range of protection of the present invention will be apparent from the appended claims.

BEST MODE

Figure 1:
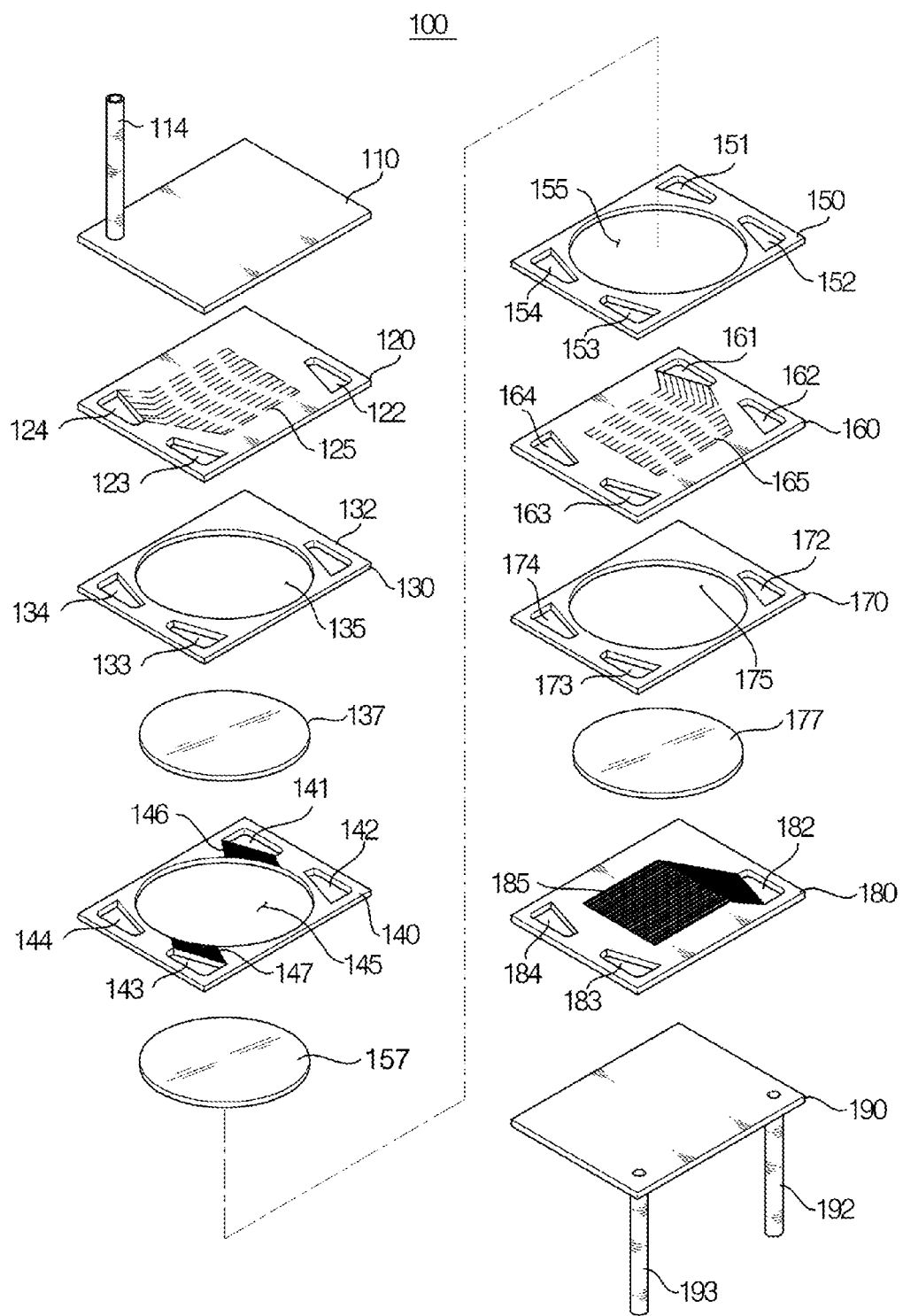
FIG. 1 is an exploded perspective view illustrating a hydrogen production reactor using a hydrogen production module according to a first embodiment of the present invention.

Hereinafter, preferable embodiments of the present invention will be described with reference to the accompanying drawings. Referring to the drawings, wherein like reference characters designate like or corresponding parts throughout the several views. In the embodiments of the present invention, a detailed description of publicly known functions and configurations that are judged to be able to make the purport of the present invention unnecessarily obscure are omitted.

All of hydrogen production modules 101 illustrated in FIGS. 1 to 6 use a high efficiency integrated reaction/separation process capable of easily being increased in scale by laminating unit cells which includes catalysts and separating membranes arranged in such a manner that the reaction efficiency thereof may be equally maximized.

The hydrogen production module 101 include an inlet passage configured to inflow a reaction gas, a first reforming passage which is communicated with the inlet passage, and is configured to contact the reaction gas supplied from the inlet passage with a first reforming catalyst so as to reform the reaction gas, a second reforming passage which is connected to the first reforming passage to pass the reformed gas between the second reforming passage and a hydrogen separation membrane, an impermeable gas discharge passage configured to discharge an impermeable gas from which hydrogen is removed while passing through the second reforming passage, a hydrogen discharge passage which is communicated with a permeation side of the hydrogen separation membrane to discharge a hydrogen gas, wherein both end portions of the inlet passage, the impermeable gas discharge passage and the hydrogen discharge passage are exposed to an outside, respectively.

That is, in consideration of laminating, both end portions of the inlet passage, the impermeable gas discharge passage and the hydrogen discharge passage are exposed to the outside, respectively. Therefore it is possible to increase hydrogen production abilities of the hydrogen production modules 101 only by connecting the inlet passage, the impermeable gas discharge passage and the hydrogen discharge passage by laminating plates forming the passages.

The hydrogen production module 101 embodying these passages includes a reaction gas inlet plate 180, a first reforming catalyst plate 170, a reformed gas transfer plate 160, a second reforming catalyst plate 150, a gap holding plate 140, a hydrogen separation membrane plate 130, and a hydrogen transfer plate 120, which may be configured in various methods within a scope and spirit of the present invention.

Each of the reaction gas inlet plate 180, the first reforming catalyst plate 170, the reformed gas transfer plate 160, the second reforming catalyst plate 150, the gap holding plate 140, the hydrogen separation membrane plate 130, the hydrogen transfer plate 120 includes hydrogen gas outlet holes 124, 134, 144, 154, 164, 174 and 184, reaction gas inlet holes 122, 132, 142, 152, 162, 172 and 182, and impermeable gas outlet holes 123, 133, 143, 153, 163, 173 and 183, which are penetrated in the above plates at a predetermined interval, respectively.

The reaction gas inlet plate 180 has a reaction gas channel 185 formed in a center portion of an upper surface thereof. In addition, the hydrogen outlet hole 184, the reaction gas inlet hole 182 and the impermeable gas outlet hole 183 are arranged around the reaction gas channel 185, and the reaction gas inlet hole 182 is communicated with the reaction gas channel 185. Therefore, the reaction gas supplied through the hydrogen production module 101 is supplied into the reaction gas inlet plate 180 only through the reaction gas channel 185.

The first reforming catalyst plate 170 is placed on the reaction gas inlet plate 180. The first reforming catalyst plate 170 includes a first reforming catalyst 177 disposed in a substantially center portion thereof. The first reforming catalyst 177 is a transmissive reforming catalyst to reform the reaction gas passing therethrough to hydrogen and hydrocarbon, and may use a porous catalyst prepared by compressing nickel powder having a diameter of 1 to 2 µm.

The first reforming catalyst plate 170 has a hydrogen outlet hole 174, a reaction gas inlet hole 172, and an impermeable gas outlet hole 173, which are disposed around a first reforming catalyst insertion hole 175.

The reformed gas transfer plate 160 is placed on the first reforming catalyst plate 170. The reformed gas transfer plate 160 includes a reformed gas channel 165 formed on a lower surface of the reformed gas transfer plate 160 at a position corresponding to the first reforming catalyst 177.

The reformed gas transfer plate 160 has a hydrogen outlet hole 164, a reaction gas inlet hole 162, an impermeable gas outlet hole 163, which are disposed around the reformed gas channel 165 so as to be spaced apart from each other, and a reformed gas supply hole 161 which is communicated with the reformed gas channel 165.

A second reforming catalyst plate 150 is placed on the reformed gas transfer plate 160. The second reforming catalyst plate 150 has a configuration similar to the first reforming catalyst plate 170.

The second reforming catalyst plate 150 includes a second reforming catalyst 157 disposed in a substantially center portion thereof. The second reforming catalyst 157 is a non-transmissive reforming catalyst to reform the reaction gas to hydrogen and hydrocarbon through a surface contact therewith, and may use a porous catalyst prepared by compressing nickel powder having a diameter of 0.5 to 1.5 µm. Therefore, the diameter of the nickel powder for preparing the second reforming catalyst 157 should be smaller than the diameter of the nickel powder forming the first reforming catalyst 177. That is, whether the reaction gas permeates therethrough is determined by using a difference in the density between the first reforming catalyst 177 and the second reforming catalyst 157.

The second reforming catalyst plate 150 has a hydrogen outlet hole 154, a reaction gas inlet hole 152, and an impermeable gas outlet hole 153, which are disposed around a second reforming catalyst insertion hole 155 so as to be spaced apart from each other. The second reforming catalyst plate 150 has a reformed gas supply hole 151 formed at a position corresponding to the reformed gas supply hole 161 of the reformed gas transfer plate 160.

The gap holding plate 140 is placed on the second reforming catalyst plate 150. The gap holding plate 140 has a gap flow hole 145 formed at a position corresponding to the second reforming catalyst 157. The gap holding plate 140 has a hydrogen outlet hole 144, a reaction gas inlet hole central region 142, an impermeable gas outlet hole 143, and a reformed gas supply hole 141, which are disposed around the gap flow hole 145 so as to be spaced apart from each other.

The gap flow hole 145 is communicated with the reformed gas supply hole 141 and the impermeable gas outlet hole 143. Herein, the reformed gas supply hole 141 is communicated with the impermeable gas outlet hole 143 through a reformed gas supplying groove 146 and an impermeable gas discharge hole 147, which are formed concavely on the upper surface of the gap holding plate 140.

The hydrogen separation membrane plate 130 is placed on the gap holding plate 140. The hydrogen separation membrane plate 130 has the same configuration as the first reforming catalyst plate 170, except that a hydrogen separation membrane 137 is disposed therein instead of the first reforming catalyst 177.

The hydrogen separation membrane 137 is disposed in the hydrogen separation membrane plate 130 at a position corresponding to the gap flow hole 145. For this, a hydrogen separation membrane insertion hole 135 is formed in a center portion of the hydrogen separation membrane plate 130.

The hydrogen separation membrane 137 may be formed in a foil form, or may be coated on a porous carrier made of a porous metal or porous ceramic by a coating method such as sputtering, electroless plating, electrolytic plating, spray coating, E-beam, or the like.

The hydrogen separation membrane plate 130 has a hydrogen outlet hole 134, a reaction inlet hole 132, and an impermeable gas outlet hole 133, which are disposed around the hydrogen separation membrane insertion hole 135 so as to be spaced apart from each other.

The hydrogen transfer plate 120 is placed on the hydrogen separation membrane plate 130. The hydrogen transfer plate 120 includes a hydrogen transfer channel 125 formed on a center lower surface thereof at a position corresponding to the hydrogen separation membrane 137. In addition, a hydrogen outlet hole 124, a reaction gas inlet hole 122, and an impermeable gas outlet hole 123 are disposed around the hydrogen transfer channel 125 so as to be spaced apart from each other. The hydrogen gas outlet hole 124 is communicated with the hydrogen transfer channel 125.

Figure 3:
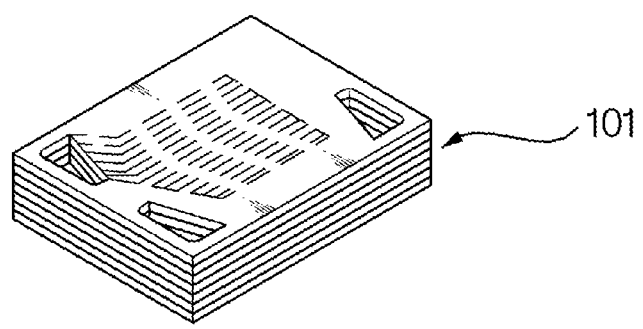
FIG. 3 is a perspective view illustrating the assembled hydrogen production module of FIG. 1.

The hydrogen production module 101 according to the present invention is basically configured as described above. When the above-described components are adhered by diffusion bonding, welding, or the like by aligning the reaction gas inlet holes 122, 132, 142, 152, 162, 172 and 182, the impermeable gas outlet holes 123, 133, 143, 153, 163, 173 and 183, and the hydrogen gas outlet holes 124, 134, 144, 154, 164, 174 and 184 with each other, one unit body is formed as illustrated in FIG. 3. As illustrated in FIG. 3, the hydrogen production module has tubular bodies formed by the hydrogen gas outlet holes, the reaction gas inlet holes, and the impermeable gas outlet holes, which are formed in the respective plates.

Various hydrogen production reactors may be manufactured by using the above-described hydrogen production module 101.

First, the hydrogen production module 101 according to first embodiment of the present invention will be described with reference to FIGS. 1 and 2.

The hydrogen production module 101 includes an upper plate 110 and a lower plate 190, which are placed on an upper side and lower side thereof, respectively.

The upper plate 110 includes a hydrogen discharge pipe 114 formed thereon. The hydrogen discharge pipe 114 is communicated with the tubular body formed by the hydrogen gas outlet holes 124, 134, 144, 154, 164, 174 and 184. In addition, the upper plate 110 closes an upper end of the tubular body formed by the reaction gas inlet holes 122, 132, 142, 152, 162, 172 and 182, and an upper end of the tubular body formed by the impermeable gas outlet holes 123, 133, 143, 153, 163, 173 and 183.

The lower plate 190 is provided with a reaction gas supply pipe 192 and an impermeable gas discharge pipe 193. The reaction gas supply pipe 192 is communicated with a lower end of the tubular body formed by the reaction gas inlet holes 122, 132, 142, 152, 162, 172 and 182, and the impermeable gas discharge pipe 193 is communicated with a lower end of the tubular body formed by the impermeable gas outlet holes 123, 133, 143, 153, 163, 173 and 183. The lower plate 190 closes a lower end of the tubular body formed by the hydrogen gas outlet holes 124, 134, 144, 154, 164, 174 and 184.

Figure 2:
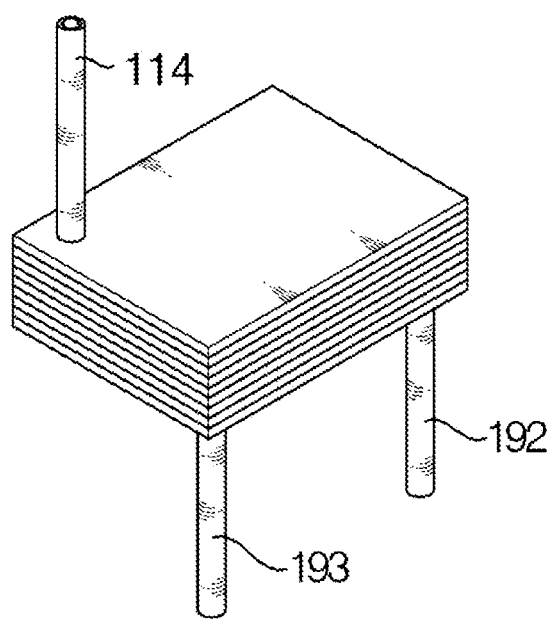
FIG. 2 is a perspective view illustrating the assembled hydrogen production reactor of FIG. 1.

When the upper plate 110 and the lower plate 190 are adhered to the hydrogen production modules 101, a hydrogen production reactor is completed as illustrated in FIG. 2.

Next, an operation of a hydrogen production reactor 100 according to the first embodiment of the present invention will be described in detail. First, a reaction gas which is mixed hydrocarbon gas with steam is supplied into the hydrogen production module from the reaction gas supply pipe 192. The reaction gas flows toward the tubular body formed by the reaction gas inlet holes 122, 132, 142, 152, 162, 172 and 182, and is supplied into the reaction gas channel 185 of the reaction gas inlet plate 180.

Further, the reaction gas is reformed to a reformed gas including hydrogen and hydrocarbon while passing through the first reforming catalyst 177 via the reaction gas channel 185. Then, the reformed gas passes through the reformed gas channel 165 of the reformed gas transfer plate 160 and flows to the gap flow hole 145 through reformed gas supplying holes 161, 151 and 141 in this order.

The reformed gas supplied into the gap flow hole 145 contacts with the second reforming catalyst 157 so as to continuously perform the reforming reaction of non-separated hydrocarbon, and the previously reformed hydrogen is moved to the hydrogen transfer channel 125 of the hydrogen transfer plate 120 passing through the hydrogen separation membrane 137.

Since the hydrogen transfer channel 125 is communicated with the tubular body formed by the hydrogen gas outlet holes 124, 134, 144, 154, 164, 174 and 184, the generated hydrogen is discharged to the outside through the hydrogen discharge pipe 114. In addition, an impermeable gas from which the hydrogen is removed in the gap flow hole 145 is transmitted to the tubular body formed by the impermeable gas outlet holes 123, 133, 143, 153, 163, 173 and 183. Then, the impermeable gas is discharged to the outside through the impermeable gas discharge pipe 193.

Figure 4:
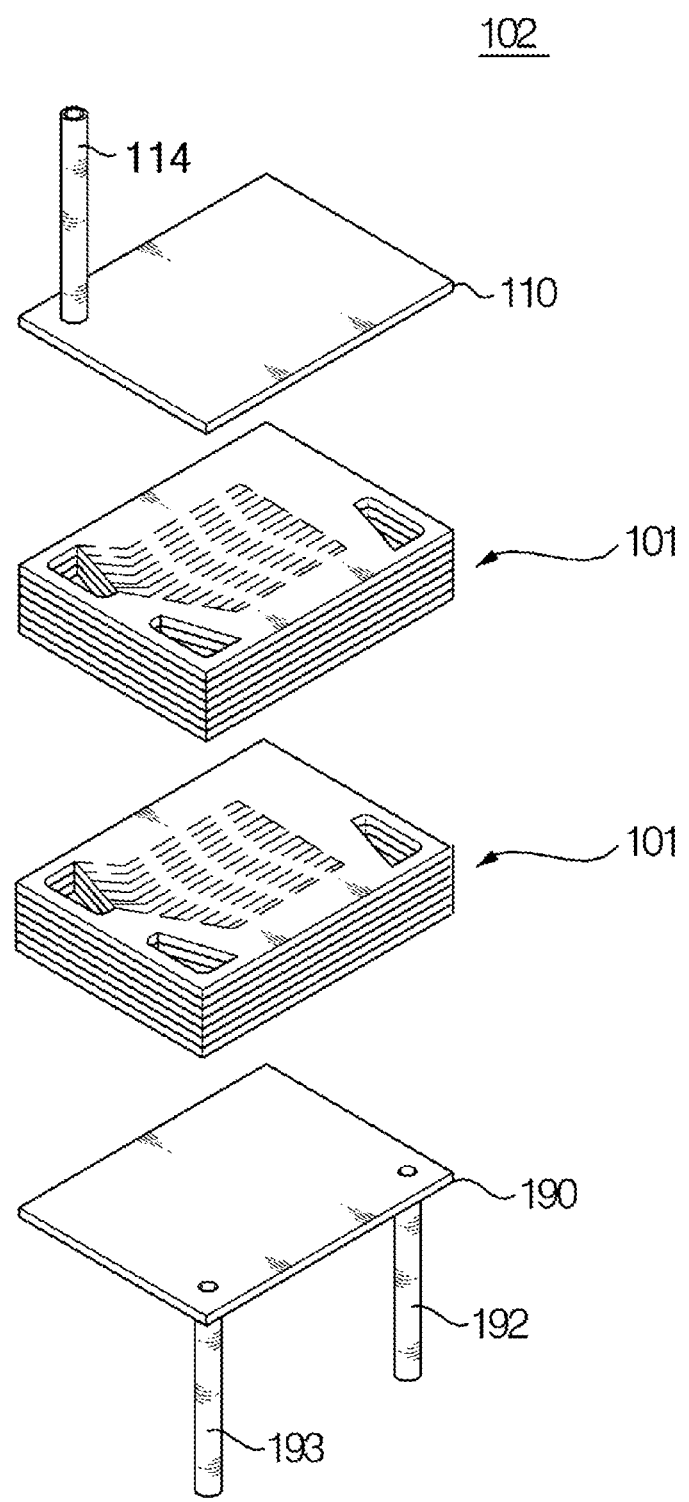
FIG. 4 is an exploded perspective view illustrating a hydrogen production reactor using a hydrogen production module according to a second embodiment of the present invention.

Next, a hydrogen production reactor 102 according to a second embodiment of the present invention will be described with reference to FIG. 4. The hydrogen production reactor 102 has the same configuration as the hydrogen production reactor 100 of the first embodiment, except that a plurality of hydrogen production modules 101 are laminated.

As described above, since the hydrogen gas outlet holes, the reaction gas inlet holes, and the impermeable gas outlet holes, which are formed in the respective plates, form the tubular bodies, and as illustrated in FIG. 3, the upper and lower end thereof are exposed to the outside, thus the plurality of hydrogen production modules 101 may be laminated.

The operation process of the hydrogen production reactor 102 is the same as that of the hydrogen production module 100 of the first embodiment, thus a description thereof will be omitted.

Figure 5:
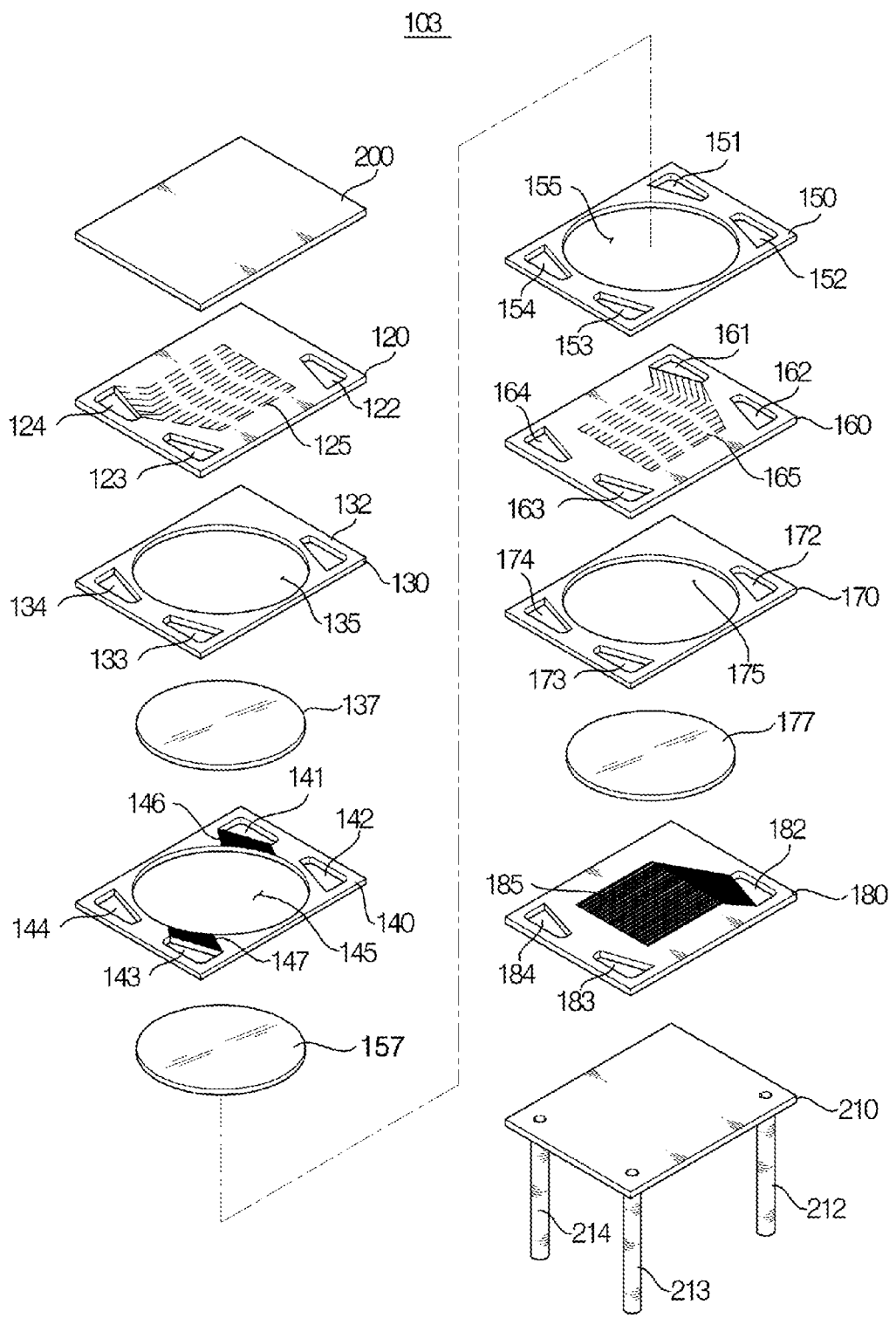
FIG. 5 is an exploded perspective view illustrating a hydrogen production reactor using a hydrogen production module according to a third embodiment of the present invention.
Figure 6:
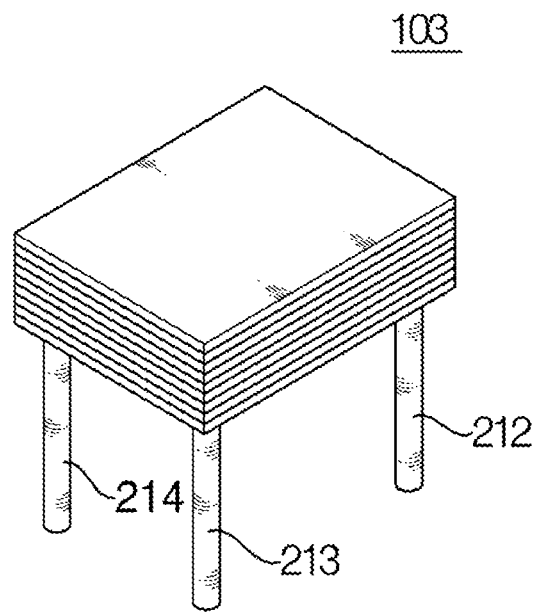
FIG. 6 is a perspective view illustrating the assembled hydrogen production reactor of FIG. 5.

Next, a hydrogen production reactor 103 according to a third embodiment of the present invention will be described with reference to FIGS. 5 and 6. The hydrogen production reactor 103 is different from the hydrogen production module 100 of the first embodiment in the configuration of an upper plate 200 and a lower plate 210. The hydrogen production reactor 103 may be suitably used in a case that a hydrogen discharge pipe 214, a reaction gas supply pipe 212 and an impermeable gas discharge pipe 213 should be disposed on the same side.

As described above, since the hydrogen gas outlet holes, the reaction gas inlet holes, and the impermeable gas outlet holes, which are formed in the respective plates, form the tubular bodies, the hydrogen discharge pipe 214, the reaction gas supply pipe 212 and the impermeable gas discharge pipe 213 are selectively disposed on one of the upper plate 200 and the lower plate 210, and are simultaneously disposed on both of the upper plate 200 and the lower plate 210. In the hydrogen production reactor 103 of the third embodiment, all of the hydrogen discharge pipe 214, the reaction gas supply pipe 212 and the impermeable gas discharge pipe 213 are disposed on the lower surface of the lower plate 210. At this time, the upper plate 200 closes the tubular bodies formed by the hydrogen gas outlet holes, the reaction gas inlet holes, and the impermeable gas outlet holes, which are formed in the respective plates. The operation process of the hydrogen production reactor 103 is the same as that of the hydrogen production module 100 of the first embodiment except that the hydrogen discharge pipe 214 is disposed on the lower surface of the lower plate 210, thus a description thereof will be omitted.

Figure 7:
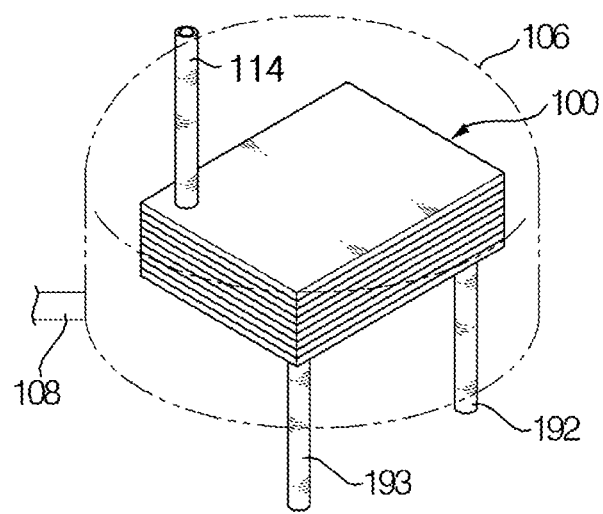
FIG. 7 is an exploded perspective view illustrating a hydrogen production reactor using a hydrogen production module according to a fourth embodiment of the present invention.

In addition, a hydrogen production reactor 104 according to a fourth embodiment of the present invention will be described with reference to FIG. 7. Since the pressure of the reaction gas supplied into the hydrogen production reactor 104 is very high, when the hydrogen production module is adhered by diffusion bonding, a safety problem may occur. In consideration of this problem, the hydrogen production reactor 104 has a configuration in which the hydrogen production module 100 of the first embodiment is installed in a pressure chamber 106, and tip ends of the hydrogen discharge pipe 114, the reaction gas supply pipe 192 and the impermeable gas discharge pipe 193 penetrate through the pressure chamber 106 to be exposed to the outside. Further, a pressurized gas supply pipe 108 is disposed on one side of the pressure chamber 106 for injecting an inert gas such as nitrogen into the hydrogen production module 101 so as to apply an external pressure thereto.

Accordingly, the hydrogen production reactor 104 may have a significantly high safety and withstand a high injection pressure of the reaction gas.

Alternately, a method in which the pressurized gas is replaced by the reaction gas may be possible. In this case, the reaction gas supply pipe 192 may be located in the pressure chamber 106, or a penetration hole may be formed in the upper plate 110 or the lower plate 190 so as to communicate the inner space of the pressure chamber 106 with the tubular body formed by the impermeable gas outlet holes 123, 133, 143, 153, 163, 173 and 183. In a case of the above-described method, there is a merit of not requiring the use of a separate inert gas.

While the present invention has been described with reference to the preferred embodiments, the present invention is not limited to the above-described embodiments, and it will be understood by those skilled in the related art that various modifications and variations may be made therein without departing from the scope of the present invention as defined by the appended claims.

DESCRIPTION OF REFERENCE NUMERALS 100, 102, 103, 104: hydrogen production module, 101: hydrogen production module
106: pressure chamber, 108: pressure gas supply pipe
110, 200: upper plate, 114, 214: hydrogen discharge pipe
120: hydrogen transfer plate,
122, 132, 142, 152, 162, 172, 182: reaction gas inlet hole
123, 133, 143, 153, 163, 173, 183: impermeable gas outlet hole
124, 134, 144, 154, 164, 174, 184: hydrogen gas outlet hole
125: hydrogen transfer channel, 130: hydrogen separation membrane plate
135: hydrogen separation membrane insertion hole, 137: hydrogen separation membrane
140: gap holding plate, 141, 151, 161: reformed gas supplying hole
145: gap flow hole, 146: reformed gas supplying groove
147: impermeable gas discharge hole, 150: second reforming catalyst plate
155: second reforming catalyst insertion hole, 157: second reforming catalyst
160: reformed gas transfer plate, 165: reformed gas channel
170: first reforming catalyst plate, 175: first reforming catalyst insertion hole
177: first reforming catalyst, 180: reaction gas inlet plate
185: reaction gas channel, 190, 210: lower plate
192, 212: reaction gas supply pipe, 193, 213: impermeable gas discharge pipe

The invention claimed is:

1. A hydrogen production module comprising:
a reaction gas inlet plate on which a reaction gas channel is formed on an upper surface thereof;
a first reforming catalyst plate which is laminated on the reaction gas inlet plate, and includes a first reforming catalyst which is transmissive to a reaction gas and is provided in a first reforming catalyst insertion hole formed therein;
a reforming gas transfer plate which is laminated on the first reforming catalyst plate, and includes a reforming gas channel formed on a lower surface thereof at a position corresponding to the first reforming catalyst;
a second reforming catalyst plate which is laminated on the reforming gas transfer plate, and includes a second reforming catalyst which is non-transmissive to the reaction gas and is provided in a second reforming catalyst insertion hole formed therein;
a gap holding plate which is laminated on the second reforming catalyst plate, and includes a gap flow hole formed therein at a position corresponding to the second reforming catalyst;
a hydrogen separation membrane plate which is laminated on the gap holding plate, and includes a hydrogen separation membrane which is provided in a hydrogen separation membrane insertion hole formed at a position corresponding to the gap flow hole; and
a hydrogen transfer plate which is laminated on the hydrogen separation membrane plate, and includes a hydrogen transfer channel formed on a lower surface thereof at a position corresponding to the hydrogen separation membrane, which are sequentially laminated in this order,
wherein each of the reaction gas inlet plate, the first reforming catalyst plate, the reforming gas transfer plate, the second reforming catalyst plate, the gap holding plate, the hydrogen separation membrane plate, and the hydrogen transfer plate of a laminated structure has a hydrogen gas outlet hole, a reaction gas inlet hole, and an impermeable gas outlet hole, which are respectively formed so as to pass through the laminated plates being disposed at positions spaced apart from each other, the reaction gas inlet hole is communicated with the reaction gas channel in the reaction gas inlet plate, the reforming gas transfer plate has a reforming gas supplying hole formed therein to be communicated with the reforming gas channel, the second reforming catalyst plate and the gap holding plate have a reforming gas supplying hole formed therein to be communicated with the reforming gas supplying hole of the reforming gas transfer plate, the gap flow hole is communicated with the reforming gas supplying hole and the impermeable gas outlet hole in the gap holding plate, and the hydrogen transfer channel is communicated with the hydrogen gas outlet hole in the hydrogen transfer plate.

2. A hydrogen production reactor comprising:

the hydrogen production module of claim 1; and an upper plate and a lower plate which cover an upper portion and a lower portion of the hydrogen production module to protect the same, wherein the reaction gas inlet hole formed in the reaction gas inlet plate which is one component of the hydrogen production module is connected with a reaction gas inlet pipe into which a reaction gas is flowed through the lower plate from an outside, the impermeable gas outlet hole formed in the reaction gas inlet plate is connected with an impermeable gas discharge pipe through the lower plate so as to discharge an impermeable gas to the outside, and the hydrogen gas outlet hole of the hydrogen transfer plate or the hydrogen gas outlet hole of the reaction gas inlet plate is connected with a hydrogen discharge pipe to discharge a hydrogen gas through the upper plate or the lower plate.

3. The hydrogen production reactor according to claim 2, wherein the reaction gas inlet hole has a cross-sectional that is larger than a cross-sectional area of the impermeable gas outlet hole.

4. The hydrogen production reactor according to claim 2, comprising one or more of the hydrogen production module.

5. The hydrogen production reactor according to claim 4, wherein the hydrogen production module is installed in a pressure chamber.

6. The hydrogen production reactor according to claim 5, wherein the reaction gas supply pipe, the impermeable gas discharge pipe, and the hydrogen discharge pipe are disposed so as to be connected to the hydrogen production module by passing through the pressure chamber.

7. The hydrogen production module according to claim 5, wherein the pressure chamber is supplied with a pressurized gas.

* * * * *